April 13, 1965 A. R. BLACKBURN ETAL 3,178,493
WARE PRODUCTION FROM MOIST PLASTIC MATERIAL
Filed Aug. 11, 1961 8 Sheets-Sheet 3

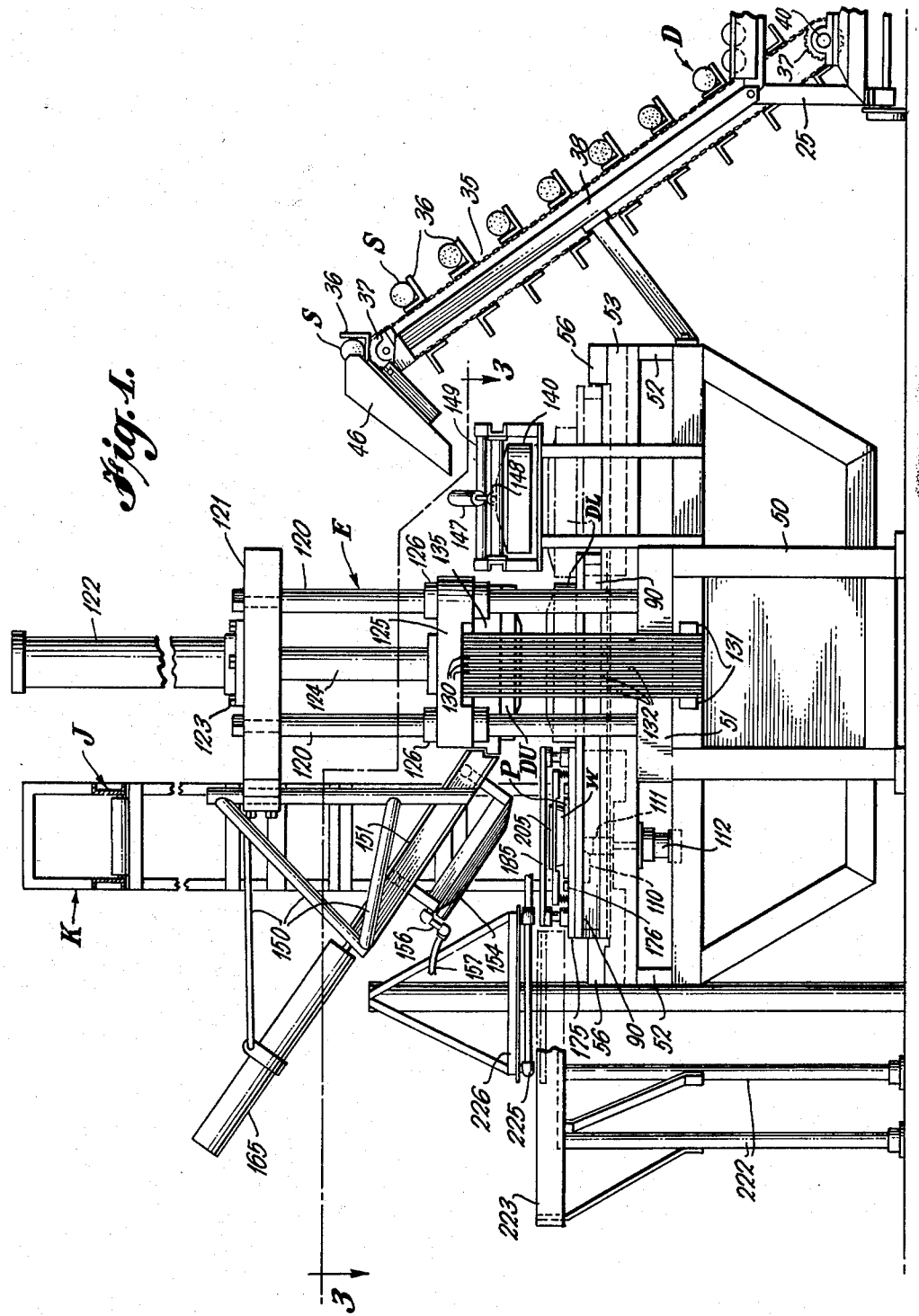

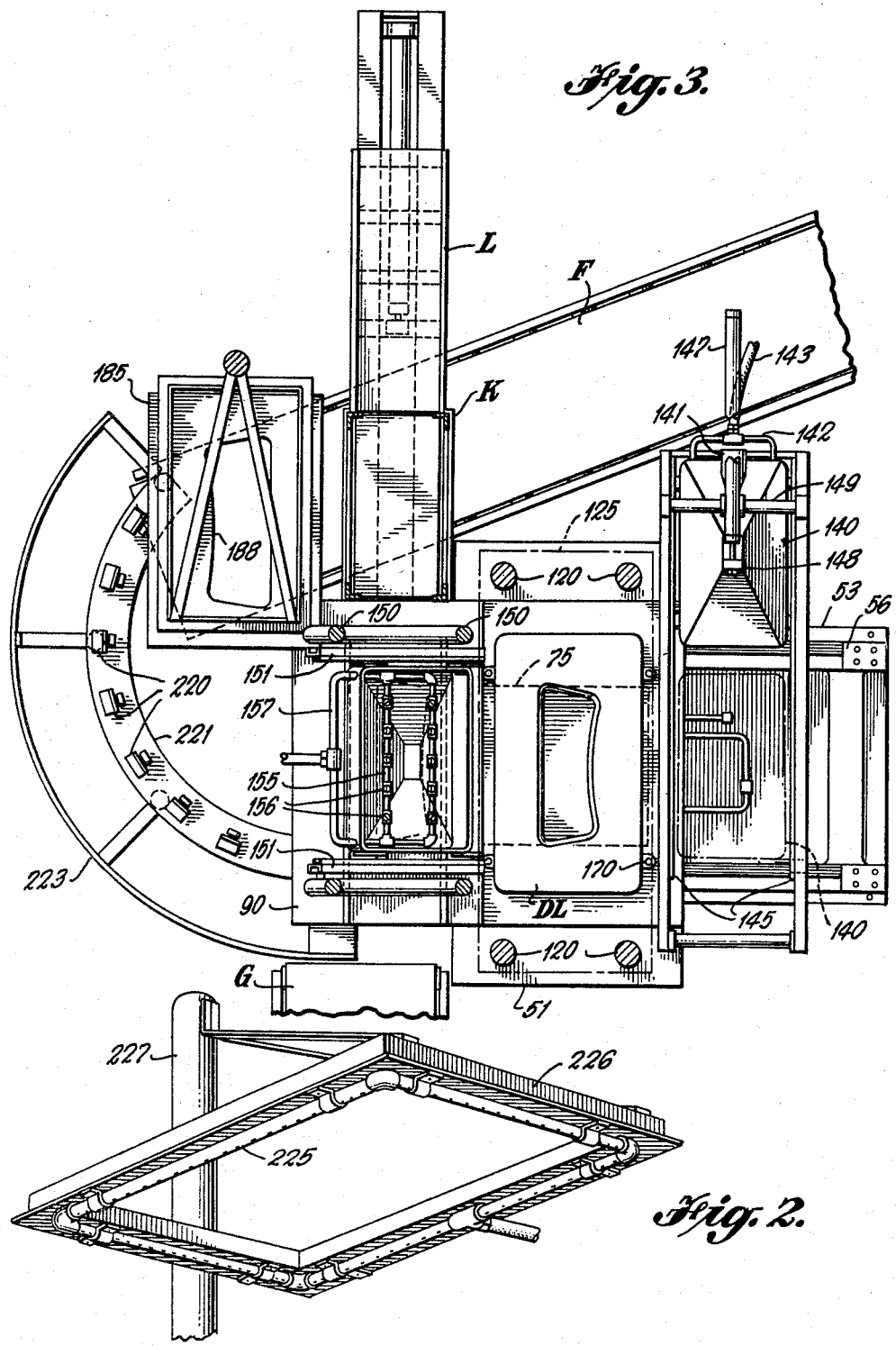

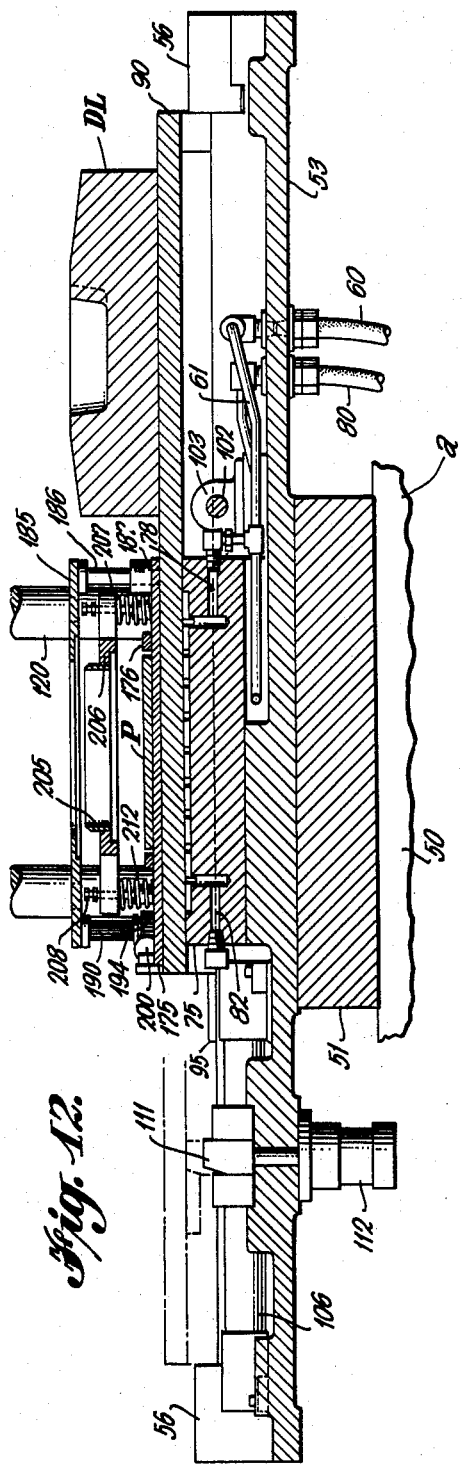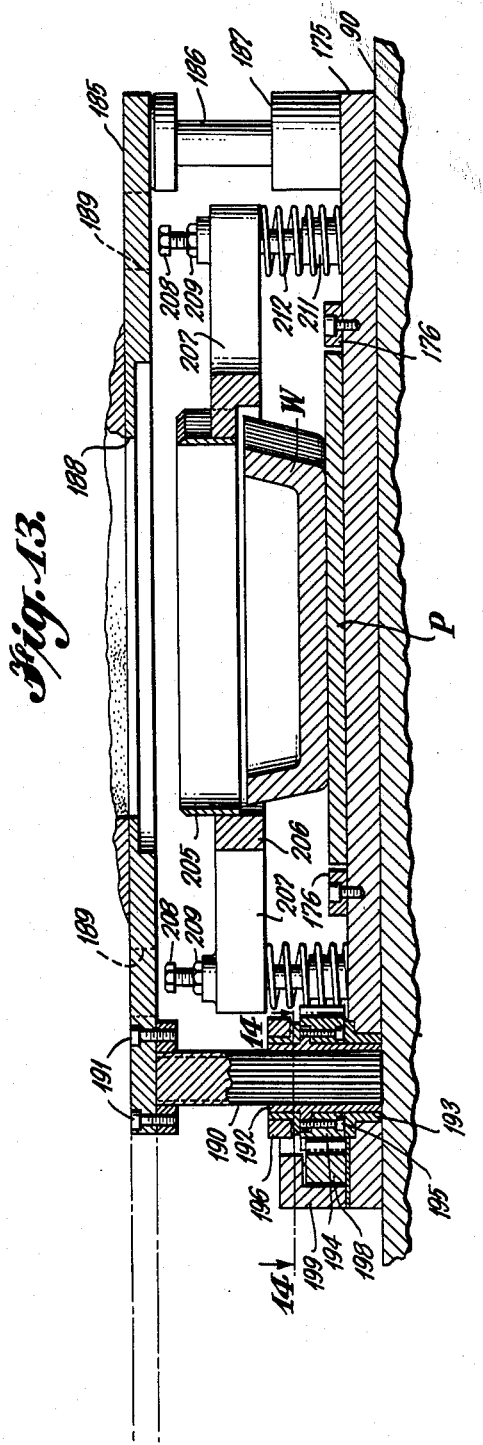

United States Patent Office 3,178,493
Patented Apr. 13, 1965

3,178,493
WARE PRODUCTION FROM MOIST
PLASTIC MATERIAL
Andrew R. Blackburn, Westerville, and Richard E. Steele and Harold H. Dawson, Columbus, Ohio, assignors to The Murray Corporation of America, Pittsburgh, Pa., a corporation of Delaware
Filed Aug. 11, 1961, Ser. No. 130,834
13 Claims. (Cl. 264—86)

The instant invention relates to ware pressing particularly adapted for the production of ceramic ware from moldable moist plastic materials such as clay. More specifically, the invention is directed to method and apparatus for ware pressing wherein effective and rapid production of pressed ware may be carried out in an essentially continuous ware producing operation with moisture removed from the material being disposed of so as to promote continuity of the production operation.

The instant invention provides for the pressing of ware wherein the material existing in a moist plastic state is employed with a single pressing operation to form this material into the ware in a self-supporting state with a portion of the moisture such as water existent in the plastic material being removed incident to the pressing operation. The instant invention makes particular application of and carries forward the ware pressing method disclosed in the Blackburn et al. Patent 2,584,109 of February 5, 1952. In use of the method of this patent, a pair of porous surfaced dies are employed which together define a ware forming cavity therebetween conforming to the desired configuration of the ware to be produced. A body of plastic material such as clay is pressed between these dies under relatively high pressure such that moisture present in the material passes into the porous die surfaces. The formed ware is released from the dies by applying fluid pressure such as air under pressure against the ware surface through the porous surfaces of the dies so that upon separation of the dies, the formed ware is readily removed therefrom.

The invention herein provides for the pressing of articles from moist plastic material in a rapid and essentially continuous manner with a relatively smooth flow of slugs of such material into the ware pressing cycle and flow of pressed ware articles from the cycle in operation of the method and apparatus and wherein moisture is removed from the material incident to carrying out the pressing cycle with this moisture being disposed of as a part of the cycle to promote uniformity of the ware produced and effectiveness of the ware pressing cycle operation.

Thus it is a primary object of the present invention to provide improved method and apparatus for the production of pressed ware from moist plastic material such as clay with moisture being removed separate from the pressed ware incident to such production.

Another object of the present invention is to provide apparatus for the production of pressed ware from moist plastic material such as clay embodying a ware press having a pair of reciprocable dies with dewatering means movable to be associated with each die of the press for removal of excess moisture from each die as needed to maintain effectiveness of the press in carrying out production of successive pressed ware articles.

A further object of the invention is to provide a ware press having upper and lower dies movable together to press ware from moist plastic material with the lower die being mounted on a horizontally reciprocable shuttle to be movable out of vertical alignment with the upper die and track mounted dewatering means is provided for each die to be movable into association with the dies when they are parted and misaligned to effect removal of excess surface moisture from the dies between successive pressing operations of the press.

It is also an object of this invention to provide a ware press embodying the features of the above object wherein the dewatering means includes a hood for each die and movable on a track to essentially enclose the die face with air jet producing means in each hood disposed to apply sweeping jets of air across the die face to effect removal of the excess surface moisture.

The above and other objects and novel features of the instant invention will be apparent from the following description taken in connection with the accompanying drawings. It is to be expressly understood, however, that the drawings are for the purpose of illustration only and are not intended to define the limits of the invention, but rather to merely illustrate a preferred embodiment and structure incorporating the features of the instant invention adapted to produce a particular pressed ware article and in carrying out the method herein.

In the drawings wherein like reference characters refer to like parts throughout the several views:

FIGURE 1 is a side elevational view showing the ware press and a portion of a suitable clay slug loader useable therewith.

FIGURE 2 is a perspective view showing the air jet nozzle assembly employed in removing scrap material created incident to operation of the ware press of FIGURE 1.

FIGURE 3 is a horizontal sectional view taken on line 3—3 of FIGURE 1.

FIGURE 12 is a longitudinal sectional view showing construction details of the press shuttle and scrap and ware removal assembly.

FIGURE 13 is a sectional view taken on line 13—13 of FIGURE 5.

GENERAL DESCRIPTION OF APPARATUS

Figure 4:
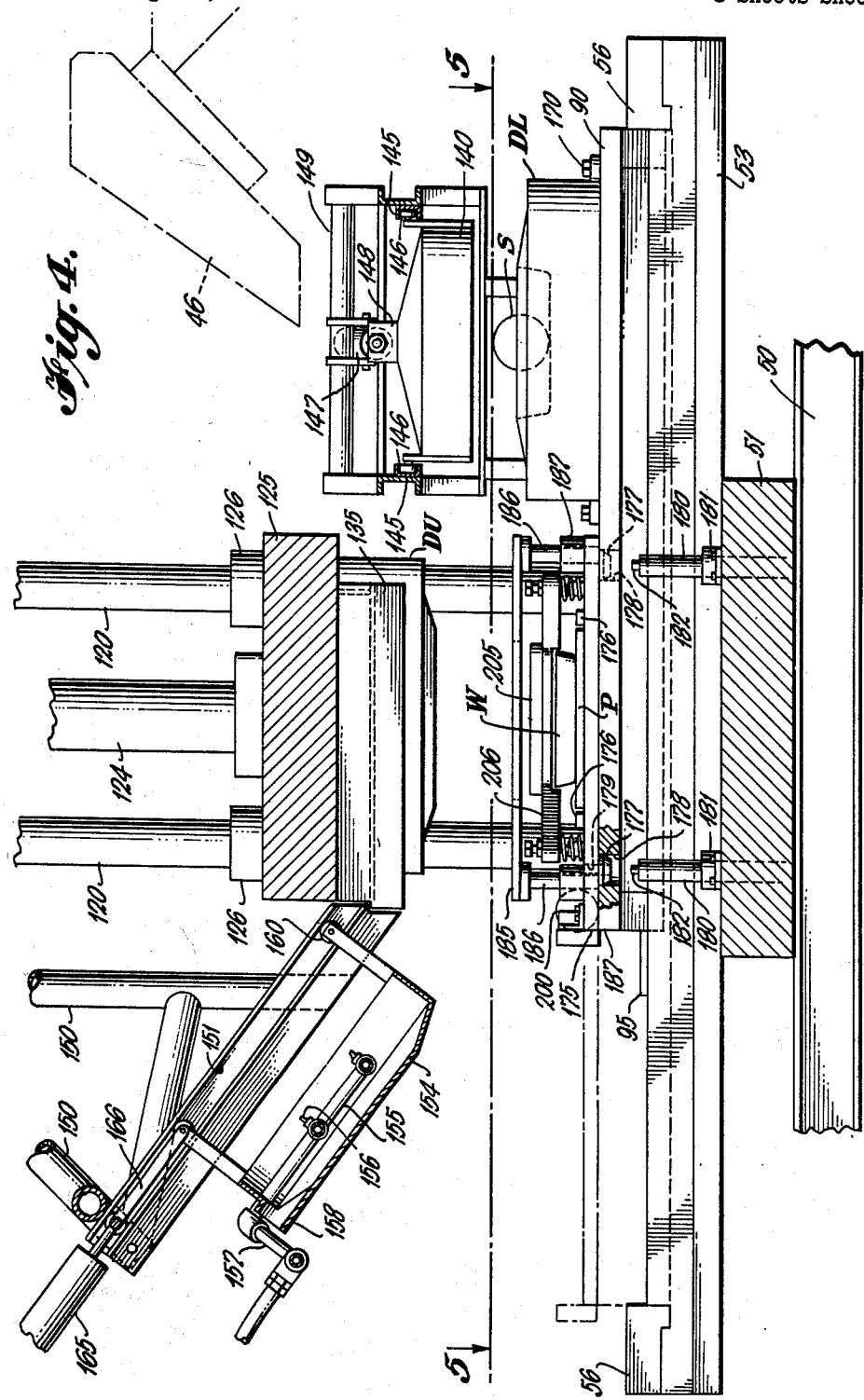
FIGURE 4 is a detailed view showing features of the ware press including the press shuttle, scrap and ware removal assembly and die dewatering hoods.

Before turning to a detailed description of the specific structural details embodied in the pressed ware producing apparatus, a general description of the components and features of the apparatus may best be given. In this respect, primary reference will be made to FIGURE 1. It may be further pointed out that as to certain features and equipment associated with the ware press which, although partially illustrated on the drawings herein, do not form a part of the instant invention, a full description and illustration thereof may be found in application Serial Number 116,135, filed June 9, 1961.

For purposes of illustration and in the specific description of one adaptation of the ware producing apparatus of this invention, the embodiment shown on the drawings will be described in connection with the production of a particular pressed ware article, namely, a toilet tank cover. It is to be expressly understood that the particular adaptation of the apparatus to produce a tank cover is only one specific example of pressed ware which may be produced through making use of the inventive features of the instant invention. Thus, an almost infinite variety of pressed ware articles may be produced with the apparatus depending primarily on the configuration of the die cavity formed between the mating dies used on the ware press.

In the specific adaptation of the apparatus, solid cylindrical lengths of clay hereinafter referred to as clay slugs S are fed to the press with each clay slug containing the proper amount of clay necessary to form the particular ware shape to be produced which in the illustrated embodiment is a toilet tank cover. The clay slugs are disposed on a clay slug loader D in parallel arrangement and are fed by the loader one by one in timed sequence with the ware press operation by passing up the inclined loader conveyor and dropping in succession from the upper end of the loader conveyor through a loading chute to load the lower die on the ware press.

The ware press is generally designated at E on FIGURE 1. This press E provides a pair of porous dies DL and DU which are employed to press the ware, i.e., a toilet tank cover as illustrated, from the clay slug S. In the press E, the lower die DL is mounted on a reciprocable shuttle so that this lower die may be shuttled between a loading position whereat it is disposed generally beneath the loading chute and a pressing position whereat the lower die DL is aligned beneath the upper die DU carried on the underside of the vertically reciprocable press platen.

The press E also includes a first dewatering hood mounted to be horizontally reciprocable in a path extending transversely above the loading position of the lower die DL so that the hood can overlie the lower die when such die is disposed in loading position and cooperate with such die to remove moisture from the surface of the lower die between ware pressing operations where a moisture containing plastic material is being used in the pressing operations. A second dewatering hood is mounted to permit it to be moved from the position shown in FIGURE 1 down beneath the upper die DU for removing moisture from the surface of the upper die after the article has been pressed.

A pallet supporting platform which functions to receive and manipulate individual pallets P for the pressed ware W, once the ware is removed from the upper die, is also carried on the press shuttle. The positioning of the pallet supporting platform on the shuttle is such that when the lower die DL is disposed at the loading position, the pallet supporting platform will be located beneath the upper die DU. Likewise, when the shuttle is shifted to carry the lower die DL to a position aligned beneath the upper die DU, the pallet supporting platform and pallet P carried thereby will be disposed in the position as shown in FIGURE 1.

A ware trimming blade is mounted above the pallet supporting platform and a scrap removing tray mounted to be swingable above the pallet supporting platform, the trimming blade and the pallet P. The trimming blade has as opening conforming in outline to the configuration of the tank cover ware W to be produced. The scrap tray is swingable to a position whereat it lies beneath an air jet nozzle manifold (FIGURE 2) by means of which air jets are directed against the scrap on the tray to blow the scrap through the tray opening. Thereupon the scrap falls onto a suitable conveyor F which carries the scrap back to a pug mill to be reworked and incorporated with clay as it is formed into slugs S.

The pallet P collects the pressed ware W as it is released from the underside of the upper die DU and facilitates handling of the ware in removing it from the press and passing it to the ware finishing operations. Thus, after the ware W has been released onto an empty pallet P on the pallet supporting platform, the shuttle is shifted to position the ware carrying pallet P as shown in FIGURE 1. The pallet with the formed ware W thereon is pushed from the press by feeding an empty pallet whereupon the ware carrying pallet P is transferred to a conveyor G for removal from the press for further processing.

GENERAL OPERATION OF WARE PRESS

The clay slugs S on slug loader D are conveyed upwardly to be discharged from the loader through the loading chute onto the lower die DL on ware press E. Of course, the press shuttle is disposed at this time with die DL in loading position to receive the slug S.

In its loaded condition, the lower die DL has a clay slug S generally centered thereon as the slug is received from the slug loader D through the loading chute. Thereupon, the shuttle is shifted and locked in place to dispose the lower die DL beneath the upper porous die DU carried on the ware press platen. The upper die DU is then lowered to press the slug S into the form of the cavity defined between the upper and lower dies.

The ware pressing operation generally employs the teachings of the ware pressing process described in Blackburn et al. Patent 2,584,109 of February 5, 1952. In this process a pair of porous surfaced dies made of a permeable plaster material are used and in the pressing action, moisture is pressed from the clay and absorbed by the porous faces of the dies. The ware becomes adhered to the faces of both the upper and lower dies as a result of the pressing action carried out in forming the ware. However, the porosity of the dies enables releasing the ware from the die faces by applying fluid pressure such as air under pressure through the faces of the dies.

Following the teachings of the above-mentioned patent, in the instant invention, releasing fluid pressure is applied across the face of the lower die DL immediately prior to separating the die DL and DU. Thus, the formed ware is released from the surface of the lower die DL and as the dies part, the ware remains adhered to the face of the upper die DU.

During the aforementioned operations, the pallet feeder L will have pushed an empty pallet P as received from pallet lowering device K to dispose this empty pallet on the pallet supporting platform. The scrap tray will be positioned as shown in FIGURE 1 so that the opening therein is aligned above the scrap trimming blade. In this relationship, the scrap tray and trimming blade will be positioned directly above the pallet P.

The shuttle is shifted to carry the now empty lower die DL back to its loading position where, prior to receiving another clay slug S from loader D, the die is subjected to a dewatering operation to remove excess moisture from the die surface. In performing this, the die is covered with the aforementioned lower die dewatering hood and the moisture is blown from the surface of the die by air jets specifically positioned within the hood to wipe the die surface. The shifting of the shuttle carries the pallet supporting platform with the empty pallet P thereon under the upper die DU. Once aligned beneath the upper die, the pallet P is raised to dispose it immediately beneath the formed ware which is still adhered to the upper die DU. Raising the pallet supporting platform also elevates the scrap trimming blade, extending it through the opening in the scrap tray so that it engages the clay flash on the underside of the upper die DU that surrounds or encircles the pressed ware whereupon the clay flash and pressed ware may be separated with the clay flash being removed as scrap.

At this time, release fluid pressure such as air under pressure is applied across the face of the upper die DU, thereby releasing the formed ware and flash from the upper die. The desired pressed ware settles through the trimming blade and opening in the scrap tray onto the pallet P while the flash settles from the upper die as scrap onto the scrap tray which encircles the trimming blade.

With the pressed ware resting on the pallet P, the pallet is lowered which also effects withdrawal of the trimming blade from the scrap tray opening. In this relation of the parts, after the upper die has been dewatered as described below, the shuttle is again shifted to move the pallet supporting platform and related parts out from under the upper die DU and move the lower die DL which has been dewatered and reloaded with a clay slug, in under the upper die.

Before the next pressing operation is carried out, the dewatering hood for the upper die is passed on its tracks under the upper die DU to remove excess moisture from the die surface. Thereby, the upper die is dewatered by blowing air across the surface thereof to remove purged surface moisture. It may be noted that the dewatering of the dies is important where moisture containing material such as clay is used in that the pressing action will usually express water from the clay as it is formed into the ware, such water being absorbed by the die surfaces. The application of the releasing fluid pressure tends to return this water to the die face blowing water and clay fines onto the surface of the ware and surface of the die. If this excess moisture is not removed between pressing operations, defective ware may be produced with imperfections occurring in the ware surface resulting from water or air blisters, improper release action may result when fluid pressure is applied across the die surface for release, etc.

With the pallet supporting platform disposed out from under the upper die DU, the scrap tray carrying the clay scrap is swung to the position shown in FIGURE 3 where it underlies an air jet nozzle ring. Air jets are then impinged beneath the edges of the ring of scrap, blowing it through the opening in the scrap tray whereupon it falls onto scrap return conveyor F. This conveyor returns the still soft clay scrap to the pug mill where it is incorporated with new clay which is extruded and formed into the clay slugs.

The pallet P with the pressed ware thereon is pushed from the pallet support platform onto the conveyor G.

WARE PRESS E

In giving a detailed description of the features of the ware press, several sub-combinations, components and assemblies may best be identified and described under separate sub-headings. However, the interaction and co-operation of these various components, assemblies and subcombinations is such that they co-act to produce an improved and most efficient automatic operation in the production of pressed ware from the clay slugs S which are formed and loaded onto the press in accordance with the procedure and apparatus described hereinabove.

*(a) Mounting and actuation of ware press shuttle*

The general overall construction of the ware press may best be understood by reference to FIGURES 1 and 3. As mentioned in the general description above, the press is provided with a shuttle carrying the lower die DL to enable it to be readily loaded and thereafter aligned beneath the vertically movable upper die DU. Considering first, the mounting of the shuttle and parts carried thereby on the press, the details are shown more specifically in FIGURES 4, 5, 6, 7, 8, 9, 10, 11 and 12.

Figure 6:
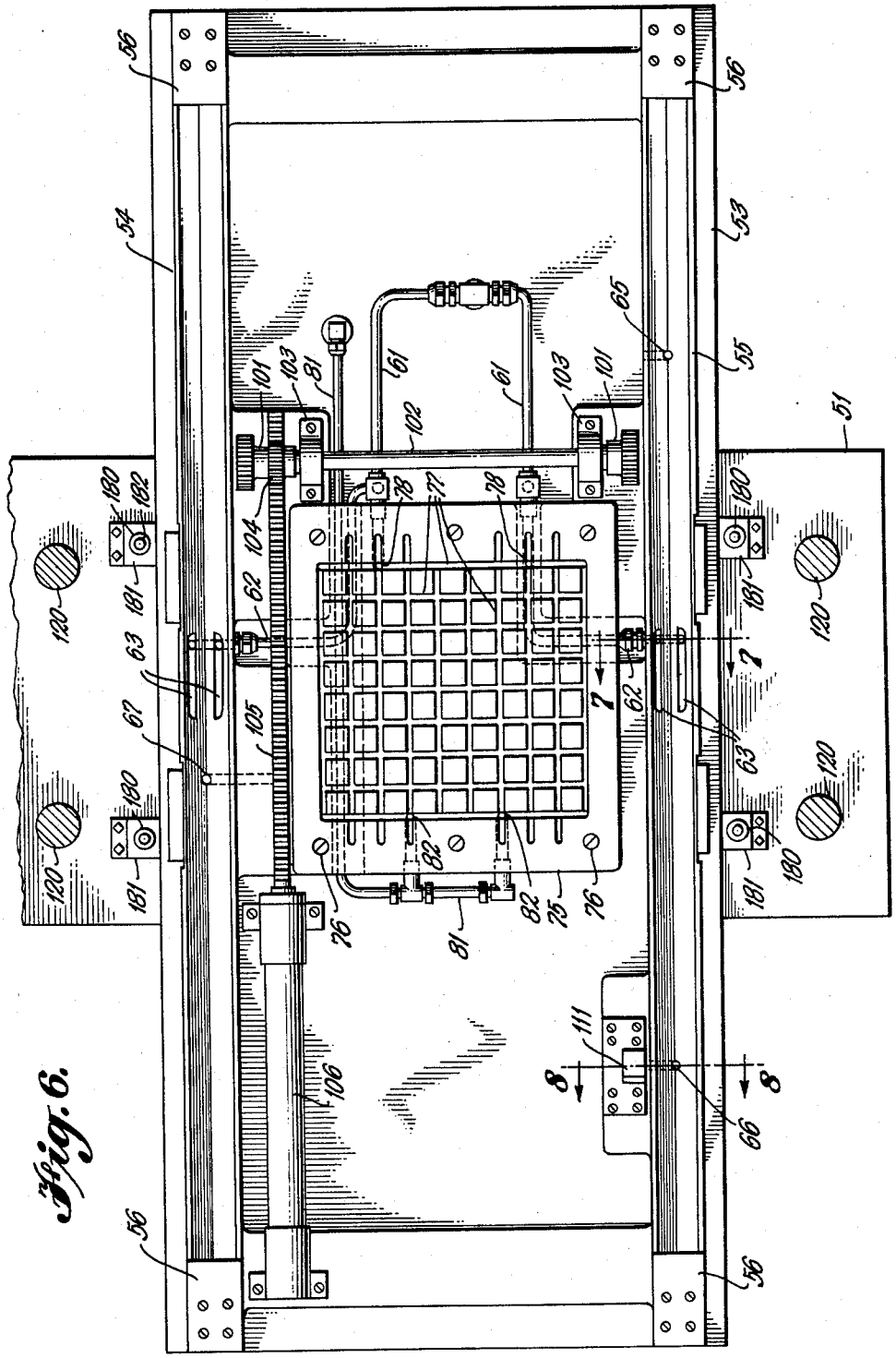
FIGURE 6 is a plan view similar to FIGURE 5 with the press shuttle removed.
Figure 7:
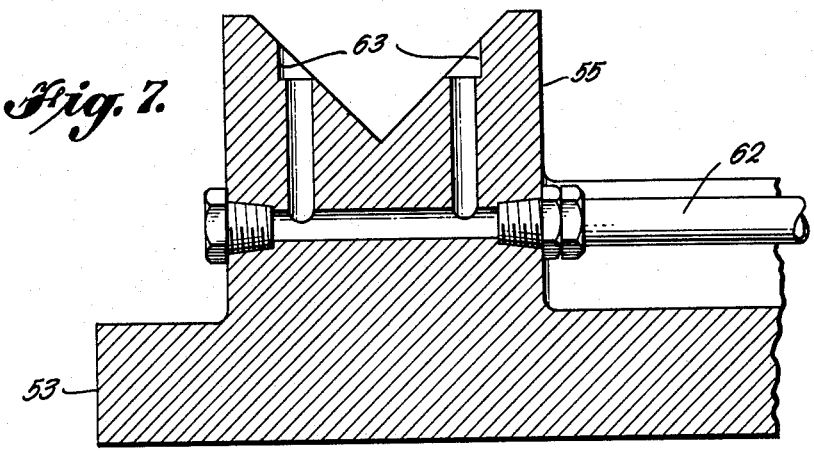
FIGURE 7 is a detailed sectional view taken on line 7—7 of FIGURE 6.

The press is formed with a welded framework base 50 which supports a bed block 51 and support members 52 at the outer ends thereof. A cast metal shuttle base 53 is mounted to extend across and be supported on bed block 51 and support members 52, all as clearly shown in FIGURE 1. A plan view of the shuttle base with the shuttle removed is shown in FIGURE 6 and a cross-section through the shuttle base 53 is shown in FIGURE 12.

The shuttle base 53 is provided on its upper face with a pair of parallel tracks 54 and 55. Each of these tracks is provided with a V-shaped groove extending along the length thereof such that the tracks have a cross-sectional configuration as shown in section in FIGURES 7 and 8. Bumper blocks 56 are bolted at the opposite ends of each of the tracks 54 and 55 to be engaged by snubbers mounted on the shuttle as will be described in connection with specific reference to the structural details of the shuttle.

Figures 8, 14:
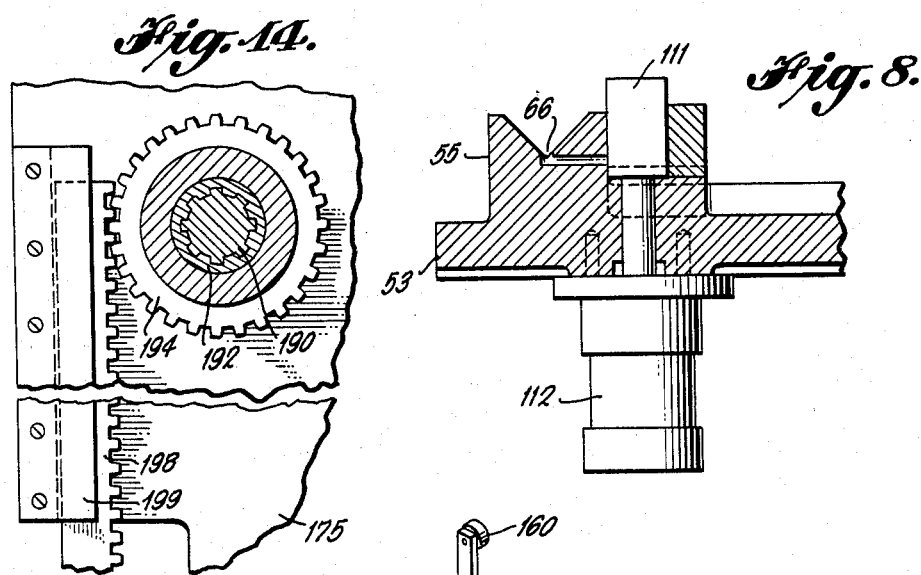
FIGURE 8 is a detailed sectional view taken on line 8—8 of FIGURE 6.
FIGURE 14 is a sectional view taken on line 14—14 of FIGURE 13.

As will be better understood from the description of the shuttle hereinafter, the tracks 54 and 55 serve to support and guide the shuttle during its shifting movements in operation of the ware press. To lubricate and facilitate shifting of the shuttle relative to the shuttle base 53, each of the tracks 54 and 55 is supplied with oil under relatively low pressure. The oil is conducted upwardly through the bottom of shuttle base 53 from a suitable supply hose 60. The oil flows therefrom through pipes 61 and a portion of the oil is directed through pipes 62 into the bottom of the respective V-shaped grooves in tracks 54 and 55. As shown in FIGURE 6, and in section in FIGURE 7, elongated recesses 63 are provided in the inclined walls of each of the V-shaped grooves to distribute the oil along the tracks. In contemplation that oil will be continuously supplied to provide a load supporting oil film along the V-shaped grooves of the tracks, a drain hole 65 is provided in the bottom of track 55 along with a drain hole 66 which latter hole supplies oil to a shuttle locking dog as shown in FIGURE 8 and later described in detail. In track 54, a drain hole 67 is provided leading to a slot which slidably receives the rack employed to effect shifting of the shuttle.

Referring again to FIGURES 6 and 12, the shuttle base 53 has a cast metal bolster 75 secured by screws 76 to the top of the central portion of the shuttle base. This bolster is important in offering a rigid, essentially non-yieldable base for supporting the ware pressing load when the lower die DL and upper die DU are operated to press the ware. The bolster overlies the central portion of the shuttle base 53 which in turn is solidly supported on bed block 51 carried by welded framework base 50. The bolster 75, while providing solid support for the pressing loads, still permits the shuttle to be readily shifted as needed in the ware pressing operation.

The upper face of the bolster 75 has a network of slots 77 milled therein which are in communication with the oil pipes 61 through bores 78 formed in the bolster. Additionally, an oil supply hose 80 (FIGURE 12) connects with pipe 81 which supplies additional oil to the milled slots 77 through bores 82 in the bolster.

Figure 5:
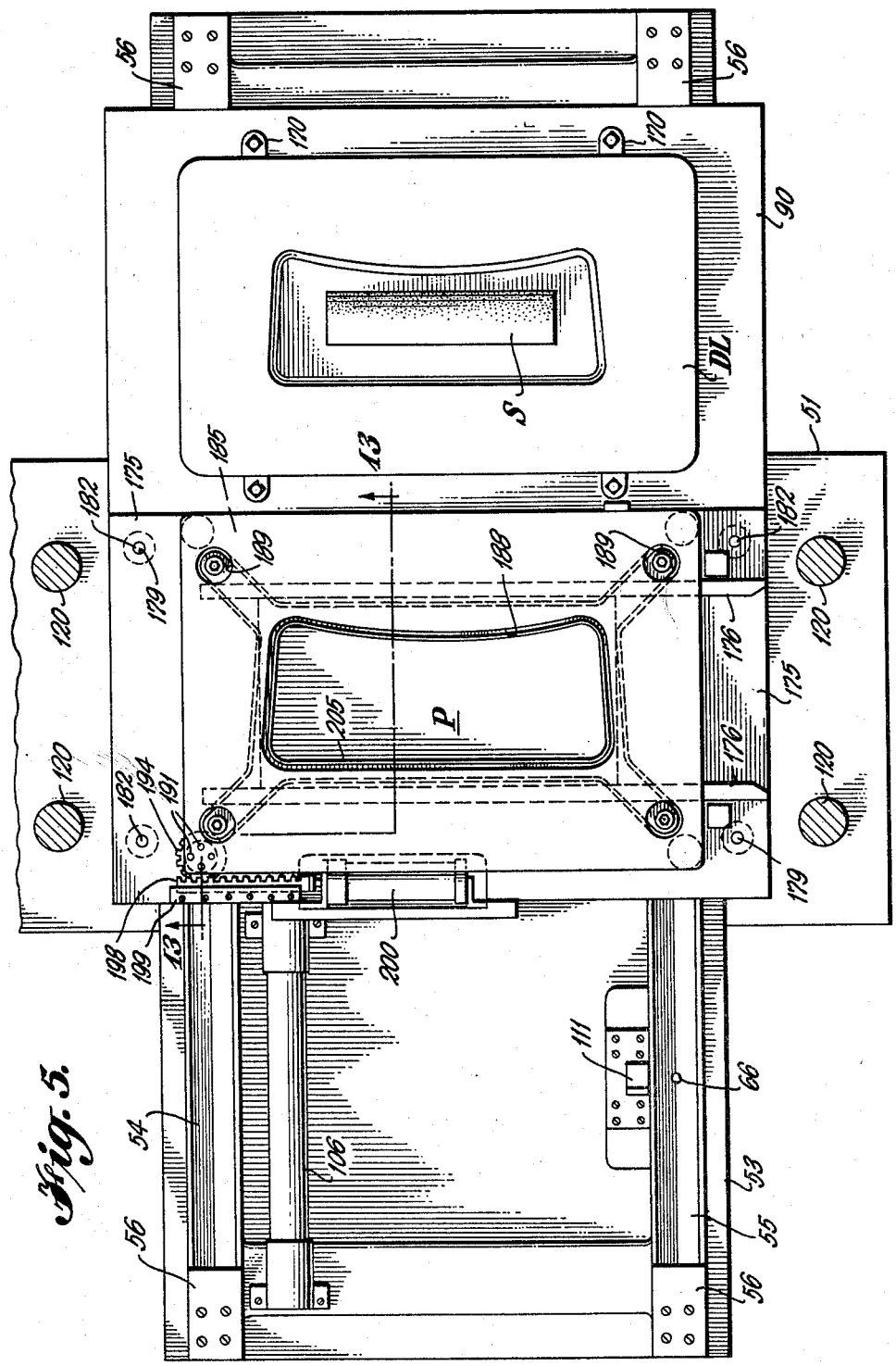
FIGURE 5 is a view taken generally on line 5—5 of FIGURE 4.
Figure 9:
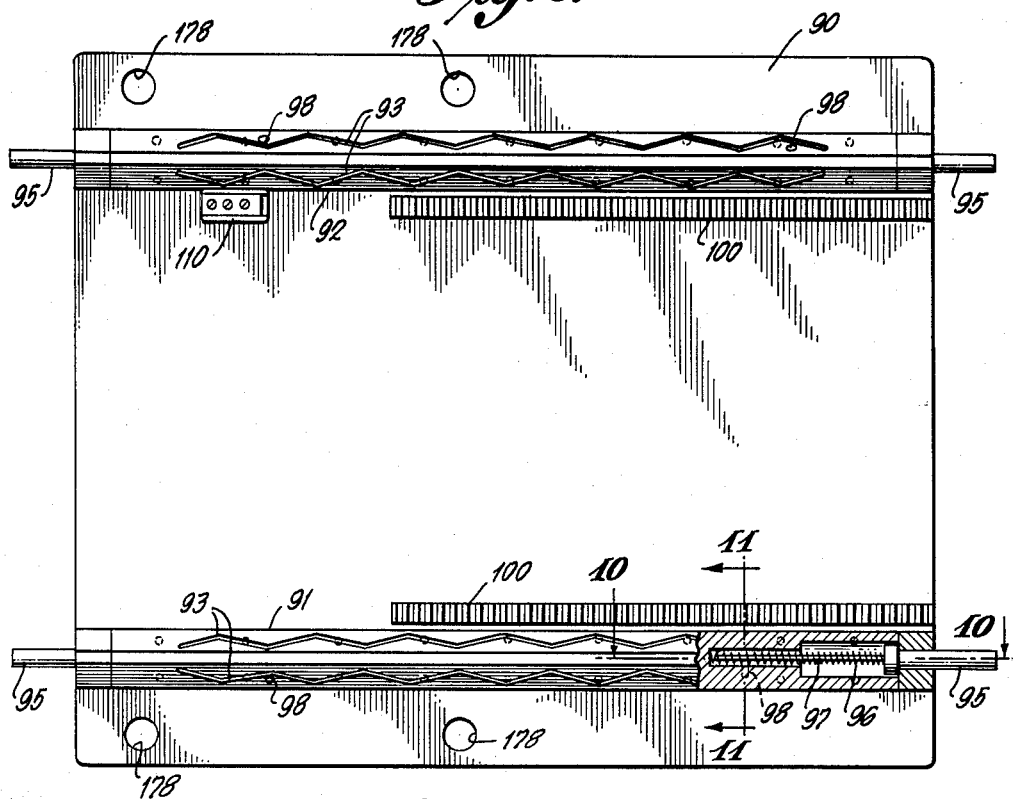
FIGURE 9 is a view with parts in section showing the under side of the press shuttle.
Figure 10:
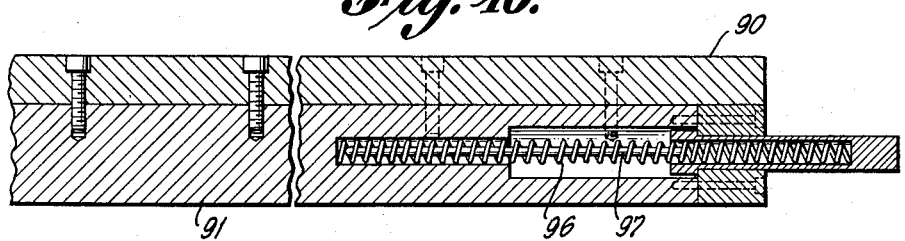
FIGURE 10 is a sectional view taken on line 10—10 of FIGURE 9.
Figure 11:
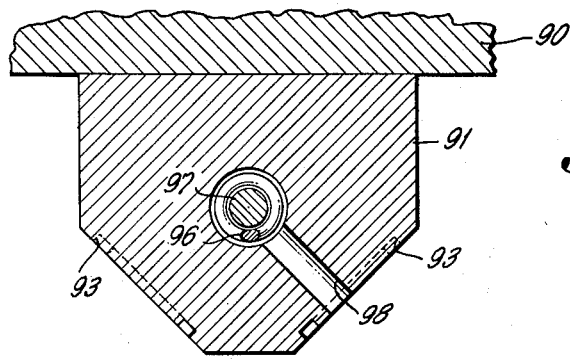
FIGURE 11 is a sectional view taken on line 11—11 of FIGURE 9.

The construction details of the shuttle 90 are illustrated in FIGURES 9, 10, and 11, while FIGURES 5 and 12 indicate the relationship that the shuttle has to the shuttle base 53 when mounted thereon. As will be better understood from the subsequent description, the shuttle mounts the lower die DL and the assemblies for trimming and separately removing the pressed ware and scrap from the press.

FIGURE 9 shows the underside of the shuttle 90 which is made up of a shuttle plate which has rails 91 and 92 mounted in spaced parallel relation to the underside of the shuttle plate. These rails 91 and 92 are spaced to mate with the V-shaped grooves in the tracks 54 and 55 on shuttle base 53 and thus each rail has a cross-sectional configuration as shown in FIGURE 11.

As referred to above, an oil film is distributed along the tracks 54 and 55 to lubricate and facilitate shifting of the shuttle 90 relative to the shuttle base 53. To promote distribution of this oil between the mating surfaces of tracks 54 and 55 and rails 91 and 92, respectively, each of the rails 91 and 92 has the inclined surfaces thereof formed with zig-zag oil grooves 93. Thus, the oil fed into the V-shaped grooves in tracks 54 and 55 through recesses 63 is distributed by grooves 93 to effectively provide an oil film between the rails and tracks such that the shuttle 90 may be shifted without undue resistance.

Each of the rails 91 and 92 is provided with a snubber 95 at each of its opposite ends. The construction of the snubber is shown in FIGURES 9 and 10. A spring 96 encircling a throttling pin 97 is disposed to bias the snubber outwardly. An oil hole 98 extends from the surface of the rails 91 and 92 to admit oil to the interior of the cavity which houses the snubber.

The snubbers 95 are positioned to engage with the snubber blocks 56 on the shuttle base 53 as mentioned above. Thus, when the shuttle 90 is shifted to one extreme position on base 53, the pair of snubbers 95 at one end of the shuttle plate engage with blocks 56 on the shuttle base 53. The snubber springs 96 act to retard the shifting movement of the shuttle once the snubbers engage to overcome the inertia of the shuttle and parts carried thereby. Further, the flanged inner end of the snubber serves to restrict flow of oil past the snubber as it moves into its cavity to additionally check the movement of the shuttle such that the shuttle will be slowed and brought to a stop at its extreme position without undue jarring of the press structure.

Referring further to FIGURE 9, the underside of shuttle 90 has parallel racks 100 secured thereto. These racks are secured in spaced relation to engage with pinions 101 (FIGURE 6) which are fastened to shaft 102 journaled in bearings 103 on the shuttle base 53. A third pinion 104 is also fixed to shaft 102 and positioned to be engaged and driven by a rack 105. This rack slides in the groove which is lubricated by oil flow from hole 67 in track 54 as mentioned above. Rack 105 is in turn connected to be operated by the piston rod of an extensible fluid motor 106, the cylinder of such motor being secured to shuttle base 53.

The shuttle 90 also has a stop 110 secured to the underside of the shuttle plate adjacent the inner edge of rail 92. A shuttle locking dog 111 (FIGURES 6 and 8) is mounted on shuttle base 53 to be raised and lowered by operation of an extensible fluid motor 112. The cylinder of such motor is secured to the underside of base 53 with the piston rod thereof connected at its upper end to the dog 111. The operation of dog 111 is employed to insure accurate and rigid locking of the shuttle during the ware pressing operation at which time the insuring of stationary and accurate positioning of the upper and lower dies is of utmost importance. In addition to locking dog 111 which locks the shuttle against horizontal shifting, means may well be provided cooperating between the shuttle and shuttle base to prevent raising of the shuttle off the base when the dies are vertically aligned. Such a hold down means can be important where proper release of the ware from the lower die does not occur and the suction between the ware and dies might lift the shuttle off the base as the upper die raises.

Turning to the actuation of the shuttle 90, and functioning of the parts in the light of the above description, the shuttle 90 is supported by means of the rails 91 and 92 thereon engaging with tracks 54 and 55 respectively on the shuttle base 53. The oil supplied through pipes 61 and 62 and recesses 63 is distributed by oil grooves 93 to slidable support the shuttle on a film of oil so that it may be readily shifted. Additionally, oil supplied to slots 77 on the bolster tends to lift and give a floating support of the shuttle where it overlies the bolster. With the shuttle mounted on base 53 in the position shown in FIGURES 5 and 12, the pinions 101 engage with racks 100 on the underside of shuttle 90. As the piston rod of motor 106 is extended rack 105 thereon drives pinion 104 which in turn, through shaft 102 rotates the pinions 101 and thereby shifts the shuttle from the position in FIGURES 5 and 12 to the opposite ends of the shuttle base 53. It will be appreciated that other suitable shuttle shifting means may be employed instead of the rack and pinion drive specifically illustrated. For example, extensible fluid motor means may be directly connected between the base and shuttle to effect shuttle shifting.

The upper surface of bolster surface 75 and the underside of shuttle 90 between the racks 100 are machines to closely mate. As heretofore noted, oil is supplied to the network of slots 77 on the face of bolster 75. This oil forms a film which minimizes resistance to sliding of shuttle 90 across the bolster 75. At the same time, the close cooperation of the shuttle with the bolster 75 provides a solid base for the pressing operation. This construction is of particular importance in successful operation of the ware press considering the danger of cracking or otherwise deforming the porous plaster dies should other than a solid base be provided to carry out the pressing operation.

Once the shuttle 90 is shifted to the opposite end of base 53 from that shown in FIGURES 5 and 12, the locking dog 111 is raised by motor 112 with the dog engaging stop 110 to firmly lock the shuttle with the end of the shuttle as shown in FIGURE 1 and in phantom in FIGURE 12 engaged with the bumper blocks 56. In accordance with the above description, as the shuttle approaches the bumper blocks 56, snubbers 95 engage the blocks and act to check the rapid movement of the shuttle to avoid undue jarring of the press as the shuttle reaches its fully shifted position.

*(b) Mounting and actuation of upper die DU*

The bed block 51 on base 50 also mounts upstanding cylindrical columns 120, a pair of such columns being provided on each side of the shuttle base 53 as shown in FIGURE 5. A platform 121 is mounted on the upper ends of these columns 120 which platform mounts a pair of extensible hydraulic motors 122. Thus, as shown in FIGURE 1, the cylinders of motors 122 are bolted at 123 to the platform 121. The piston rods 124 of the motors extend downwardly through platform 121 and are connected to operate the press platen 125, which carries the upper die DU on the underside of the platen.

Platen 125 has guide sleeves 126 adjacent the corners thereof which slidably engage with the cylindrical columns 120 to guide vertical movements of the platen. It will be appreciated that motors 122 through their piston rods 124 are effective to operate the press platen 125 and thus perform the ware pressing operation when the shuttle 90, carrying the loaded lower die DL, is aligned beneath the upper die as shown in FIGURE 1.

The platen 125 has a series of parallel rods secured to one end thereof, as shown in FIGURE 1. These rods extend downwardly and slidably engage between guides 131 mounted on base 50. A group of appropriately located trippers 132 are mounted between adjacent rods at selected positions to effect timing of various operations to be carried out incidental to raising and lowering of the press platen 125.

Although not specifically shown, it will be understood that appropriate valves or switches to control the desired press operations may be mounted on base 50, each to be engaged by a particular tripper 132 as the platen 125 is raised and lowered. The point at which the particular operation controlled by a specific tripper 132 is initiated or terminated may be readily adjusted by merely adjusting the position of the specific tripper longitudinally of the parallel rods 130.

*(c) Mounting and actuation of die dewatering hoods*

As a consequence of the pressing of ware starting from a moist clay slug or other moist plastic material, the porous dies in most cases will absorb moisture from the clay. Although a limited amount of moisture in the dies is desirable to obtain good release action of the pressed ware from the dies and to obtain the best possible surface on the pressed ware, an excess amount of water is to be avoided. When the dies acquire too much water, release of the pressed ware may be difficult under certain conditions and also the ware is subject to being covered by a layer of water, which water then must be removed by subsequently drying, thereby prolonging the operation of producing the final article. Therefore, when excess moisture accumulates it must be purged or removed from the dies at intervals.

The amount of moisture which can accumulate in a die without adversely effecting its performance will vary to some extent with every die and the operations performed in use of the die. However, in any specific case there are limits to the proper moisture content within which the die will function satisfactorily. The fluid pressure applied across the face of the die to effect release of the pressed ware will return a portion of the moisture within the porous die to its surface. This excess moisture may then be removed after the ware is separated from the die and in some instances this will suffice to keep the die properly moisture conditioned for most effective ware production. The rapidity with which the die surface is treated after ware release to remove this excess moisture will also effect the amount of moisture that can be removed since when the release fluid pressure is terminated the moisture on the die surface will immediately commence to be absorbed back into the die surface by capillary action.

If for a specific die and pressing operation the moisture expelled incident the ware release and thereupon removed from the die still permits an excess build-up of moisture in the die, purging pressure may be maintained across the face of the die after the ware has been separated therefrom. This purging pressure will expel more moisture from the die which may be removed to maintain the moisture condition of the die within the proper limits for the specific die and pressing operation being carried out.

Where a plastic material containing moisture such as water is being used the apparatus of the instant invention provides die dewatering hoods which are employed to maintain the moisture condition of the dies within the proper limits for most effective ware production. The mounting and construction of the die dewatering hoods is illustrated in FIGURES 1, 3 and 4.

The lower die DL faces upwardly. In the loading position, the upwardly facing surface of the die is exposed. To remove the excess surface moisture, the dewatering hood 140 for the lower die is mounted to be shifted horizontally from a position where the lower die is exposed to receive a clay slug from the slug loader D to a position where it overlies the loading position of the lower die DL. The hood 140 has a pan-like configuration which is open at its underside and has an outlet 141 through which air and moisture exit. The hood has a nozzle manifold (not shown) mounted therein which is connected by a pipe 142 to an air hose 143. The air nozzles on the manifold are specifically arranged to jet air downwardly against particular locations on the face of the lower die DL, whereby moisture is driven from the face and entrained in the air which exits through outlet 141. The particular arrangement of the nozzles for directing the air jets will vary with each die surface configuration and must be disposed to take into consideration the specific contour of the die surface from which the excess moisture is to be removed.

Parallel tracks 145 are mounted to extend above the loading position of the lower die DL. The hood has rollers 146 which engage with tracks 145 so that the hood is suspended from the tracks and movable generally horizontally from a dewatering position whereat it overlies the lower die DL to a retracted position, as shown in FIGURE 3. Thus the tracks 145 are constructed such that as the hood is shifted to its dewatering position closely overlying the lower die DL the air jets may be most effective in removing the surface water. A suitable extensible fluid motor 147 is connected to the hood at 148 with the cylinder thereof mounted above tracks 145 on a support 149 to effect shifting of the hood at the proper time to effect dewatering.

To dewater the upper die DU, a dewatering hood 154 similar to hood 140 is mounted on platform 121 by a framework 150 which carries inclined tracks 151. These tracks terminate adjacent the upper position of platen 125 and are constructed to mate with parallel tracks 135 carried on the underside of platen 125 at the opposite ends of upper die DU.

Figure 15:
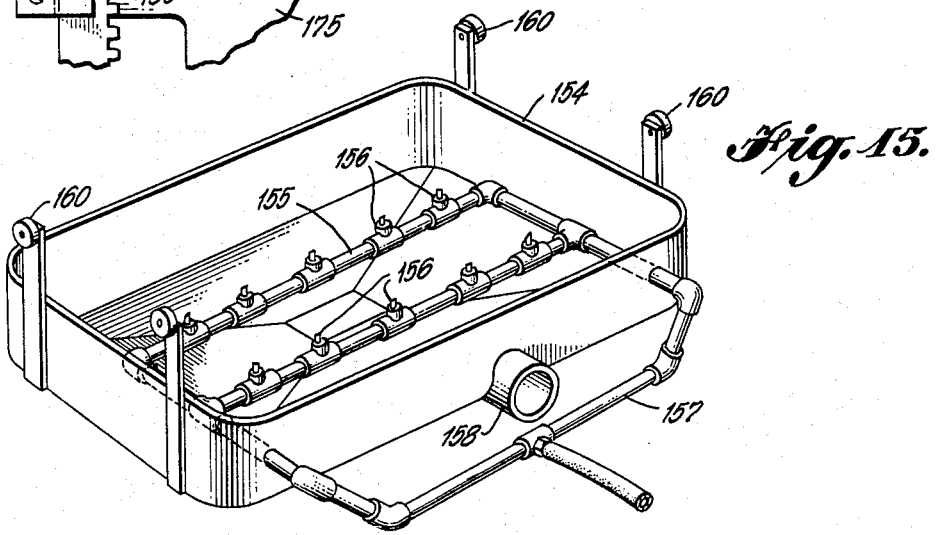
FIGURE 15 is a perspective view of the upper die dewatering hood.

The hood 154 and hood 140 are generally similar, both having an open pan-like configuration, as shown more clearly for hood 154 in FIGURE 15. A nozzle manifold 155 is mounted within the hood having nozzles 156 to form fan-like air jets directed outwardly through the open face of the hood. Air is supplied to the nozzle ring through pipe 157 from a flexible hose connected thereto. The hood 154 has an air and moisture outlet 158 similar to the outlet 141 of hood 140.

The configuration of the nozzle manifolds in the hoods 140 and 154 and the positioning of the nozzles thereon, such as nozzles 156 on manifold 155, are particularly important in their relationship to the press dies to remove excess moisture from the die surfaces. By reference to the nozzle positioning shown with respect to hood 154 it may be pointed out that nozzle 155 will expel fan-like jets of air which will impinge against the die with which the hood cooperates. These fan-like jets are so disposed relative to the configuration of the particular article being pressed, i.e., a tank cover, that the jets will effectively sweep the die surface to remove moisture from corners and crevices of the die as well as planar surfaces. The directing of the air jets is important with respect to each different set of dies employed with the press. Thus, the configuration of the manifold which determines the arrangement of the nozzles, the particular positioning of nozzles on the manifold in relation to jets from adjacent nozzles and in relation to the die contours are all factors which must be considered in constructing nozzle manifolds for the hoods to be used with a particular set of dies, since the die contours to be accommodated in removing die surface moisture have an important bearing on how the air jets should strike the die surface to remove this moisture.

Rollers 160 are mounted on the ends of the hood 154 disposed to engage with tracks 151 and tracks 135 as best shown in FIGURE 4. An extensible fluid motor 165 is supported on the framework 150 with the piston rod connected through a suitable linkage 166 to extend and retract the dewatering hood 154.

With the press platen 125 in its raised position as shown in FIGURES 1 and 4, the motor 165 is operated to extend the hood 154 with rollers 160 moving down inclined tracks 151 and into the horizontal tracks 135 carried on the underside of platen 125. This positions the hood beneath the upper die DU where the air jets from nozzle manifold 155 impinge upon the downwardly facing surface of the die to blow off excess moisture which exits through outlet 158. Thereafter, the motor 165 is again operated to retract the upper dewatering hood 154 to the position as shown in FIGURES 1 and 4.

(d) *Mounting and actuation of scrap trimming and separate pressed ware and scrap removal assemblies on shuttle*

The lower die DL is bolted at 170 adjacent one end of shuttle 90 so that when the shuttle is shifted to the position shown in FIGURE 1 and locked by engagement of dog 111 with stop 110, the upper and lower dies will be vertically aligned to carry out pressing of the ware from a clay slug S previously loaded onto the lower die. The other end of the shuttle 90 carries assemblies for receiving and removing the pressed ware when it is released from the under surface of the upper die DU, for trimming the clay flash from the pressed ware and for removing the flash as scrap separate from the pressed ware. The structure for handling the pressed ware and scrap is best shown in FIGURES 1, 4, 5, 12, 13 and 14.

A pallet supporting platform 175 rests on the upper surface of shuttle 90. This platform has spaced parallel side rails 176 secured on the upper face thereof between which is positioned the pallet P to receive the ware and be employed in handling its removal from the press. The underside of platform 175 is provided with four sockets 177 which are received in the bores 178 formed in the shuttle 90 (FIGURE 9). These sockets 177 each have a bore 179 which is engaged in the raising and lowering of the platform as described below. In its normal position, platform 175 rests on shuttle 90 with the sockets 177 engaged in bores 178 as shown in FIGURE 4.

When the ware is to be released from upper die DU and the scrap trimmed and removed therefrom, in the illustrated embodiment the pallet P is raised to dispose it immediately beneath the upper die so that upon being released, the pressed ware will have only a small distance to settle from the upper die onto the pallet P. To raise the pallet P, the platform 175 is lifted by four lifting pins 180 which are mounted in bushings 181 to extend downwardly through the bed block 51 and be elevated and retracted at the proper times to engage with bores 179 in the sockets 177 and raise and lower the platform 175. The lifting pins 180 have reduced diameter ends 182 which mate with bores 179 in sockets 177 to insure proper operation in the raising and lowering of the pallet supporting platform. The operation of raising and lowering lifting pins 180 may be effected by suitable motor means (not shown) mounted in the base 50 below bed block 51. The pins 180, as shown more clearly in FIGURE 6, are disposed outwardly of the shuttle base 53 such that in their retracted condition they do not interfere with shifting of the shuttle 90 as effected by motor 106.

A scrap removal tray 185 is mounted on the platform 175 by three mushroom headed pins 186 which slidably engage with sleeve bushings 187 affixed to the upper surface of platform 175. These pins are disposed at three of the four corners of tray 185 as shown in FIGURE 5.

Tray 185 has a central opening 188 (FIGURE 5) conforming generally to but slightly larger than the peripheral contour of the pressed ware W. Also apertures 189 are provided in tray 185 to accommodate upper limit studs on the scrap trimming assembly.

As shown in FIGURE 13, the fourth corner of the scrap tray 185 is supported by a spline shaft 190 mounted on the underside of tray 185 by a flange on the shaft engaged by cap screws 191. The spline shaft 190 slideably engages with an internally splined sleeve 192 which in turn is rotatably mounted in a bushing 193 secured to the pallet supporting platform 175. The sleeve 192 has a pinion 194 secured thereto by cap screws 195. A ring 196 encircles the upper end of sleeve 192 and is flush therewith to form a stop for the flange on spline shaft 190 when the platform 175 is raised and, during such upward movement, picks up the scrap tray 185.

Each of the mushroom headed pins 186 and the spline shaft 190 extend through the platform 175 and rest on the upper surface of the shuttle 90. These pins and the spline shaft are thus slideable relative to platform 175 such that as the platform is raised by the action of lifting pins 180, the tray 185 initially remains stationary until the head of pins 186 and bushings 187 and the flange on shaft 190 and ring 196 move together. Thereafter, the tray 185 moves up with platform 175.

A rack 198 is mounted to engage with pinion 194 with movement of the rack being guided by an angle member 199 secured to platform 175. The rack is connected to the piston rod of an extensible fluid motor 200 with the cylinder of such motor secured to the platform 175. The operation of motor 200 by driving rack 198 is thus effective through pinion 194, sleeve 192 and splined shaft 190 to swing the scrap tray 185 as is done in pivoting the tray for removal of the scrap therefrom. It will be appreciated that the splined shaft and internally splined sleeve may be replaced with other means to effect pivoting movements of the tray, one such alternative being the use of a square shaft slidably received within a square bore sleeve with roller bearings mounted within the sleeve bore to promote sliding movement of the square shaft within the bore.

The pallet supporting platform 175 also carries a scrap trimming blade 205 which is mounted in a holder 206. Holder 206 has an inner opening with the blade 205 secured to the perimeter of this opening. Although shown with a somewhat sharpened upper edge to effect a distinct severing of the flash clay from the pressed ware, blade 205 under some conditions may have a blunt edge whereby the flash is pressed against the upper die and the flash in effect torn from the pressed ware when the ware is released.

The formation of the holder opening and blade affixed thereto is such that the blade embraces an area corresponding to the periphery of the particular pressed ware to be produced. In the illustrated embodiment, the suggested pressed ware being a toilet tank cover, the blade 205 has a configuration corresponding to the desired external configuration of the tank cover as shown in FIGURE 5. The opening 188 in the scrap tray 185 is such that the blade 205 can pass therethrough without striking the tray and engage with the flash clay on the underside of the upper die DU to trim away the flash from the pressed ware.

The holder 206 has outwardly extending support arms 207. Each of these arms has an internally threaded bore with a stud 208 provided with a lock nut 209 threaded into the upper end thereof. These studs in the scrap trimming operation pass upwardly through the openings 189 in the scrap tray 185 and engage with the underside of the frame of the upper die DU to limit upward movement of blade and thereby avoid undue pressure of the blade 205 against the underside of the die. By appropriate adjustment of the lock nuts 209, the proper degree of engagement of the blade 205 with the flash clay on the undersurface of the upper die DU can thus be achieved.

The lower ends of the threaded bores in arms 207 are provided with headed studs 210 which extend downwardly and slidably engage in sockets 211 fastened on the platform 175. A spring 212 is disposed between the platform 175 and the underside of each arm 207 to normally urge the blade 205 and holder 206 upwardly such that the heads of studs 210 are seated in the sockets 211. In this state, the blade and holder assume a position relative to platform 175 as shown in FIGURES 4, 12 and 13.

In the light of the above-described structure, the functioning of the assemblies for removing the pressed ware from the upper die for trimming the flash scrap clay from the ware and for removing the scrap separate from the ware may be described.

Assuming the shuttle 90 positioned as shown in FIGURE 12 and the platform 175 having an empty pallet P positioned thereon between rails 176, the platform will be resting on the shuttle 90 and the scrap tray 185 and trimming blade 205 disposed as shown in FIGURE 12. Thereupon the lifting pins 180 are elevated from bed block 51 to engage with sockets 177 on the platform 175 thereby raising the platform. During initial raising movement of the platform, the scrap tray 185 will remain stationary since it is supported on pins 186 and splined shaft 190 which are slidable relative to platform 175 and rest on the upper surface of shuttle 90.

The blade 205 on holder 206 is carried upwardly with platform 175 by reason of springs 212 biasing it to its elevated position above the platform. By this action, the scrap tray 185 is lowered relative to platform 175 to a point such that the blade 205 extends through opening 188 in the tray. When the studs 208 on blade holder 206 engage the underside of the upper die frame, further upward movement of the blade 205 is prevented. However, before this occurs, the blade will have moved upwardly to sever the flash clay around the perimeter of the pressed ware or with a blunt-edged blade press the flash up against the upper die to hold it while the pressed ware is released. Further upward movement of platform 175, as pins 180 continue to rise, will result in compressing the springs 212 while the pallet P is raised closer to the pressed ware to receive it from the under face of the upper die DU. Release pressure is then applied internally of the upper die to release the pressed ware W as well as the flash from the die surface on which it has been retained. The ware W thereupon drops onto the empty pallet P with the flash falling as scrap onto the scrap tray 185 which surrounds the trimming blade 205. With a blunt-edged blade 205 the weight of the pressed ware may be relied upon to tear the flash from the ware since the flash is held against the upper die by the blade during release of the ware.

The lifting pins 180 are then retracted to lower to platform 175 back down to rest on shuttle 90. During this lowering movement, the blade 205 in holder 206 and the scrap tray 185 are returned to their positions relative to platform 175 as shown in FIGURE 13 with the scrap resting on the tray 185. At this point, the shuttle may be shifted by operation of motor 106 and thereafter the scrap removed from tray 185 and ware carrying pallet P removed and replaced by an empty pallet P. It will be appreciated that instead of raising the pallet, scrap trimming blade, etc., the upper die may be lowered to effect the trimming and/or for release of the ware onto the pallet.

With the scrap disposed on tray 185, and the platform 175 lowered so that the parts are returned as shown in FIGURE 13 with the pallet P having the ware W resting thereon, the shuttle 90 is shifted by operation of motor 106 to the position as shown in FIGURE 1. In this position, the scrap tray 185 and pallet supporting platform 175 are removed from beneath the upper die DU.

Motor 200 is then operated such that rack 198 pivots the scrap tray 185 through pinion 194 and splined shaft 190 connected to the scrap tray. In this pivoting movement, the tray 185 slides across the mushroom headed pins 186 and across a series of arcuately spaced rollers 220. These rollers are supported on an arcuate rail 221 which in turn is mounted on suitable support legs. A guard rail 223 may also be provide supported on the legs and disposed to enclose the outermost swinging path of movements of the scrap tray 185.

The scrap tray 185 is swung through an arc of 180° to a point where it lies beneath an air jet nozzle manifold 225. This manifold is mounted on the underside of a rectangular frame 226 which is supported from a suitable stanchion 227. In this position of the scrap tray 185 with the air jet nozzle manifold 225 disposed thereabove and with the opening 188 of the scrap tray overlying the scrap return conveyor F, air is supplied to the air jet nozzles on manifold 225 from a suitable air pressure line. The jets of air from nozzle manifold 225 impinge on the upper surface of the scrap tray 185 immediately outwardly of the edges of the ring of scrap to pass inwardly beneath the edges of the scrap ring and lift it on a layer of air. The inward movement of the air jets blows the ring of scrap clay material toward the center of the tray where the air passes down through opening 188 and the scrap falls through the opening 188 and onto conveyor F. Thereafter, motor 200 is again operated to return tray 185 across rollers 220 and back onto the mushroom headed pins 186 to reposition the tray for the next operation of removing scrap.

Also, while the shuttle is positioned as shown in FIGURE 1, the pallet feeder L operates to push an empty pallet P between the side rails 176 and onto the pallet supporting platform 175. This operation pushes loaded ware carrying pallet P off of platform 175 and onto conveyor G which carries the pallet with the ware thereon from the press.

The structural details of the scrap return conveyor F and conveyor G need not be specifically described since they form no part of the instant invention, although the conveyors do cooperate in the over-all apparatus to render the ware production continuous and automatic. A variety of appropriate conveyor constructions may be employed as desired with conventional conveyor structures being shown as are employed in the apparatus of FIGURE 3.

SPECIFIC WARE PRESS OPERATION

The loader D moves the slugs S one at a time to charge the lower die DL of the ware press. The shuttle 90 on the ware press E is moved to position the lower die DL as shown in FIGURE 4 and loader D loads the die dropping a slug S through chute 46.

Thereupon motor 106 is operated to shift the shuttle 90 to the position shown in FIGURE 1 whereat the lower die DL is positioned directly beneath the upper die DU. Once shifted the dog 111 is raised by motor 112 to engage locking stop 110. This positively locks the shuttle in position which is important when the dies are closed and the extreme pressure applied to press the ware.

In this relation the motors 122 are supplied with hydraulic fluid to drive the press platen 125 down whereupon the clay slug S is formed into the shape of the die cavity which in the instant example corresponds to the configuration of a tank cover. After completing the pressing operation, the press platen 125 is raised by motors 122. Before raising the platen to separate the upper and lower dies, release pressure is applied through the porous lower die DL so that the pressed ware will be released from the lower die and will move upwardly, retained on the underside of the upper die DU. It will be appreciated that any flash clay surrounding the pressed ware will also be released from the lower die and be retained on the upper die.

The locking dog 111 is retracted by motor 112 to release the shuttle. The shuttle 90 is again shifted by operation of motor 106 to return it to the position as shown in FIGURE 4.

With the shuttle positioned as shown in FIGURE 4 the lifting pins 180 are elevated to raise the platform 175 along with the trimming blade 205 and scrap tray 185. The parts are thus raised to assume a position as shown in FIGURE 15 resulting in the blade 205 severing the scrap from the desired pressed ware W whereupon release pressure is applied to the porous upper die DU and the ware W settles onto the empty pallet P while the flash is released as scrap onto scrap tray 185.

The lifting pins 180 are then lowered returning the platform 175 to rest on the pallet 90. The scrap and ware W are now separated in the manner as shown in FIGURE 13.

While the ware W and scrap are being separated and released from the upper die DU, the dewatering hood 140 for the lower die is shifted by operation of motor 147 to overlie the lower die DL which die is then in the loading position. With the hood 140 so positioned, air is applied through the air jets in the hood 140 to blow off and carry away excess moisture from the surface of the lower die. If more moisture need be removed to maintain proper moisture condition of the die, a purging pressure may be applied after the ware release pressure is terminated. Upon completion of this operation the motor 147 is again operated to retract the dewatering hood 140. The lower die DL is now in condition to receive another clay slug and accordingly motor 44 on loader D operates to drop another slug through chute 46 thereby loading the die DL.

The shuttle 90 is again shifted by motor 106 and locking dog 111 operated by motor 112 to lock the shuttle in position. Before undertaking the next pressing operation, the dewatering hood 154 for the upper die is extended by operation of motor 65 to dispose the hood beneath upper die DU. Air jets are then jetted from nozzle ring 155 against the under surface of the upper die DU to remove excess moisture from the die surface. As mentioned in connection with dewatering the lower die, a purging pressure may be applied to the upper die after the release pressure is terminated if the die condition calls for removal of a greater amount of moisture. Dewatering hood 154 is thereafter retracted by motor 165 and the pressing operation commenced by moving press platen 125 down to form the ware from the most recently placed slug of clay in the lower die DL.

During this second pressing operation, the scrap previously removed and now resting on tray 185 is cleared from the tray by operating motor 200 which pivots the tray across the series of rollers 220 to position it beneath air jet ring 225. Air under pressure is applied to ring 225 and the air jets lift the scrap ring and blow it inwardly and down through the center opening 188 of tray 185 whereupon it falls onto scrap return conveyor F. This conveyor carries the scrap back to the pug mill dumping it in with the clay being kneaded to be formed into slugs S.

At the same time the pallet feeder L operates to push an empty pallet P onto platform 175 while the ware loaded pallet is pushed off of the platform onto conveyor G. With an empty pallet on platform 175 and the scrap tray cleared and returned by operation of motor 200, the mechanism is ready to perform the next operation of removing and separating the ware and scrap which has been produced by a second pressing operation. It will thus be appreciated how this sequence of operations may be carried out in accordance with timed operation of the various components to produce in a continuous manner pressed ware free of flash scrap material.

The loaded pallet is carried on conveyor G and the ware exposed to a drying operation whereafter the pallet and ware are separated, the ware then being given a final trimming, glazed, and fired.

Many variations and modifications of the present invention will occur to those skilled in the art from a study of the invention modification specifically disclosed herein. All such variations and modifications which come within the spirit and scope of the appended claims are intended to be included herein as fully and completely as if they had been specifically illustrated, described and claimed. Thus the modification specifically disclosed is exemplary only and not intended to be limiting on the scope of the invention.

We claim:

1. Apparatus for producing pressed ware from plastic material comprising a press having a vertically reciprocable press platen carrying an upper downwardly facing ware forming die and a press bed disposed beneath said platen, a shuttle mounted on said press bed to be movable in a generally horizontal path beneath said platen, a lower upwardly facing ware forming die mounted adjacent one end of said shuttle, said shuttle being movable between a first position whereat said lower die is positioned beneath said upper die and a second position whereat the opposite end of said shuttle is positioned beneath said upper die, first hood means providing a chamber mounted to be movable into cooperation with said upper die, second hood means providing a chamber mounted to be movable into cooperation with said lower die, each of said hood means having air jet means therein for directing jets of air against the die face for removing excess surface moisture therefrom, and means for moving said hood means to place the respective chambers thereof in cooperation with the respective upper and lower dies when said shuttle is in said second position.

2. Apparatus for producing pressed ware from plastic material comprising a press having a vertically reciprocable press platen carrying an upper downwardly facing ware forming die and a press bed disposed beneath said platen, a shuttle mounted on said press bed to be movable in a generally horizontal path beneath said platen, a lower upwardly facing ware forming die mounted adjacent one end of said shuttle, said shuttle being movable between a first position whereat said lower die is positioned beneath said upper die and a second position whereat the opposite end of said shuttle is positioned beneath said upper die, first track means supported in association with said upper die, first hood means supportingly mounted on said first track means and provided with a chamber to be movable into cooperation with said upper die from a position disposed laterally of the path of vertical reciprocation of said press platen, second track means supported in association with said lower die, second hood means supportingly mounted on said second track means and provided with a chamber to be movable into cooperation with said lower die when said shuttle is in said second position, each of said hood means having air jet means therein for directing jets of air against the die face for removing excess surface moisture therefrom, and means for moving said hood means to place the respective chambers thereof in cooperation with the respective upper and lower dies when said shuttle is in said second position.

3. Apparatus for producing pressed ware from plastic material comprising a press having a vertically reciprocable press platen carrying an upper downwardly facing ware forming die and a press bed disposed beneath said platen, a shuttle mounted on said press bed to be movable in a generally horizontal path beneath said platen, a lower upwardly facing ware forming die mounted adjacent one end of said shuttle, hood means providing chambers carrying air jet nozzle means therein, means mounting said hood means to be positionable with said chambers disposed respectively above said lower die and below said upper die such as to direct air jets against the die surfaces for removing water therefrom, said shuttle being movable between a first position whereat said lower die is positioned beneath said upper die and a second position whereat the opposite end of said shuttle is positioned beneath said upper die, power means for moving said dies together when said shuttle is in said first position to form the pressed ware from plastic material disposed between said dies, and means for releasing the pressed ware from said lower die as the dies separate and for subsequently releasing the pressed ware from said upper die when said shuttle is in said second position to deposit the ware on the opposite end of said shuttle.

4. Apparatus for producing pressed ware from plastic material comprising a press having a vertically reciprocable press platen carrying an upper downwardly facing ware forming die and a press bed disposed beneath said platen, means mounting a first dewatering hood relative to said upper die to be movable beneath said upper die when said platen is raised, a shuttle mounted on said press bed to be movable in a generally horizontal path beneath said platen, a lower upwardly facing ware forming die mounted adjacent one end of said shuttle, means mounting a second dewatering hood relative to said lower die to be movable above said lower die, said dewatering hoods each providing a chamber therein with an open face area to overlie the die with which it is to cooperate and air jet forming means with the chamber to direct jets of air outwardly of said open face area and against the surface of the die with which it cooperates for removing water therefrom, said shuttle being movable between a first position whereat said lower die is positioned beneath said upper die and a second position whereat the opposite end of said shuttle is positioned beneath said upper die, and means for moving said hoods into cooperation with the respective upper and lower dies when said shuttle is in said second position.

5. Apparatus for producing pressed ware from moist plastic material comprising a press having a reciprocable press platen carrying a first ware forming die, a second ware forming die mounted to cooperate with said first die to form pressed ware from plastic material disposed between said dies, a pair of dewatering hoods each providing a chamber therein with an open face area to overlie and cooperate with one of said dies, air jet forming means in each of said hoods disposed to direct jets of air outwardly of said open face area and against the surface of the die with which it cooperates for removing water therefrom, means mounting one of said hoods relative to said first die to be movable from a position disposed laterally of the reciprocating path of said first die to a position whereat said open face area of said one hood is opposite the die surface, means mounting the other of said hoods relative to said second die to be movable from a position disposed laterally of said second die to a position whereat said open face area of said other die is opposite the die surface, and means for applying air under pressure to said air jet forming means to jet air across the die surfaces when said hoods are positioned with the open face areas thereof opposite the die faces.

6. Apparatus for producing pressed ware as recited in claim 5 wherein said mounting means for each of said hoods includes tracks positioned to slidably support said hoods for movement between said positions disposed laterally of said dies to said positions whereat the open face areas of the hoods are opposite the die surfaces.

7. Apparatus for producing pressed ware as recited in claim 5 wherein said air jet forming means in each hood includes a manifold mounting a series of nozzles thereon with fan jet tips on each nozzle outlet to produce a fan-like jet of air from each nozzle.

8. Apparatus for producing pressed ware from moist plastic material comprising a press having a press platen carrying a first ware forming die, a second ware forming die mounted to cooperate with said first die to form pressed ware from palstic material disposed between said dies, said press platen being reciprocable from a retracted position to a position whereat said first die cooperates with said second die, a pair of dewatering hoods each having wall means defining a chamber with an open face area at one side of said chamber, air jet forming means in the chamber of each hood disposed to direct jets of air outwardly of said open face area and against the surface of the die with which the hood cooperates for removing water therefrom, track means extending laterally of the reciprocating path of said press platen and mounting one of said hoods relative to said first die including a movable track section carried by said press platen and a stationary track section, said track sections having the ends thereof aligned for movement of said one hood therealong when said platen is in said retracted position, track means extending laterally of said second die and mounting the other of said hoods, means for moving said hoods along said track means to positions whereat the open face areas of the hoods are opposite the respective die surfaces, and means for applying air under pressure to said air jet forming means to jet air across the die surfaces for removal of excess surface moisture therefrom.

9. Apparatus for producing pressed ware from plastic material as recited in claim 8 wherein said stationary track section is inclined at an angle to the reciprocating path of said press platen.

10. A method of producing pressed ware from plastic material comprising the steps of loading a slug of moist plastic material on an upwardly facing lower die while disposed in a loading position vertically misaligned from a downwardly facing upper die and with a ware receiving pallet vertically aligned beneath said upper die, simultaneously shifting said lower die and pallet relative to said upper die to vertically align said dies and withdraw said pallet from beneath said upper die, moving said dies together to form the pressed ware from the slug, releasing the pressed ware from said lower die while separating said dies to retain the ware on said upper die, simultaneously moving said lower die and pallet relative to said upper die to return said lower die to said loading position and dispose said pallet beneath said upper die, releasing the ware from said upper die to deposit the ware on said pallet, enclosing the die surface of each of said upper die and said lower die with a chamber, sweeping the enclosed die surfaces with air to remove excess surface moisture therefrom, removing the die surface enclosing chambers, and repeating the above-recited group of steps to produce in succession pressed ware pieces from slugs of moist plastic material.

11. A method of producing pressed ware from plastic material comprising the steps of loading a slug of moist plastic material on an upwardly facing lower die while disposed in a loading position vertically misaligned from a downwardly facing upper die and with a ware receiving pallet vertically aligned beneath said upper die, simultaneously shifting said lower die and pallet relative to said upper die to vertically align said dies and withdraw said pallet from beneath said upper die, moving said dies together to form the pressed ware from the slug, releasing the pressed ware from said lower die while separating said dies to retain the ware on said upper die, simultaneously moving said lower die and pallet relative to said upper die to return said lower die to said loading position and dispose said pallet beneath said upper die, releasing the ware from said upper die to deposit the ware on said pallet, purging excess moisture to the adjacent surface of each of said dies, enclosing the die surface of each of said dies with a chamber, sweeping the enclosed die surfaces with air to remove the purged surface moisture therefrom, removing the die surface enclosing chambers, and repeating the above-recited group of steps to produce in succession pressed ware pieces from slugs of moist plastic material.

12. A method of producing pressed ware from moist plastic material comprising the steps of placing a slug of moist plastic material between a pair of dies having porous die surfaces, moving said dies together to form the pressed ware from the slug and express moisture from the plastic material into the porous die surfaces, separating said dies and removing the pressed ware, enclosing the die surface of each of said dies with a chamber, sweeping the enclosed die surfaces with air to remove excess surface moisture therefrom, and removing the die surface enclosing chambers.

13. A method of producing pressed ware from moist plastic material comprising the steps of placing a slug of moist plastic material between a pair of dies having porous die surfaces, moving said dies together to form the pressed ware from the slug and express moisture from the plastic material into the porous die surfaces, separating said dies and removing the pressed ware, purging excess moisture to the adjacent surface of each of said dies, enclosing the die surface of each of said dies with a chamber, sweeping the enclosed die surfaces with air to remove excess surface moisture therefrom, and removing the die surface enclosing chambers.

References Cited by the Examiner

UNITED STATES PATENTS

| | | | |
|---|---|---|---|
| 1,655,878 | 1/28 | Reif | 25—156 |
| 2,533,263 | 12/50 | Johnson. | |
| 2,638,654 | 5/53 | Jordan | 25—63 |
| 2,672,669 | 3/54 | Davis | 25—41 |
| 2,877,531 | 3/59 | Heine | 25—45 |
| 2,921,355 | 1/60 | Gould et al. | 25—27 |

ALEXANDER H. BRODMERKEL, *Primary Examiner.*

ROBERT F. WHITE, *Examiner.*